Aug. 1, 1967     F. G. LAMB     3,333,907

ICE BEARING

Filed March 29, 1965

FRANK G. LAMB
INVENTOR

BY
BUCKHORN, BLORE, KLARQUIST & SPARKMAN
ATTORNEYS

United States Patent Office 3,333,907
Patented Aug. 1, 1967

3,333,907
ICE BEARING
Frank G. Lamb, 560 Ridgeway Road,
Lake Oswego, Oreg. 97034
Filed Mar. 29, 1965, Ser. No. 443,214
9 Claims. (Cl. 308—77)

ABSTRACT OF THE DISCLOSURE

A bearing for a shaft formed by cooling a shaft supporting structure below freezing point and introducing water between shaft and structure so as to form a lubricating film of ice upon the structure.

---

The present invention relates to a bearing construction and more particularly to a bearing utilizing a frozen fluid such as water as a portion of the bearing surface.

In many environments it is difficult to maintain an adequate film of lubrication in a bearing structure. For example, under vacuum many of the usual lubricants tend to evaporate. This, in and of itself, causes difficulty but may cause additional difficulty in that the evaporating lubricant may be deleterious to the environment or to the products being handled in such environment. An example of this is in the vacuum drying or freezing of foods wherein food may be contaminated and acquire an undesirable taste by reason of the vaporization of a petroleum lubricant or the like.

It is an object of the present invention to provide a new and improved bearing construction obviating certain of the above mentioned difficulties.

More particularly, it is an object of the present invention to provide a bearing construction utilizing a frozen fluid as a portion of the supporting surface thereof.

A specific object of the present invention is to provide a bearing having a layer of ice as a supporting surface.

Another object of the present invention is to provide a new and improved method of providing a film of lubricating medium between a pair of relatively moving elements.

Still other objects and advantages of the invention will become apparent hereinafter.

In accordance with an illustrated embodiment, the invention comprises a bearing for a rotating shaft including a block type housing having a lining of copper or other suitable material defining a bearing sleeve for such shaft. The block is formed with annular recesses or chambers surrounding the sleeve through which a refrigerant may be passed. Means are also provided to permit the introduction of water between the shaft being supported and the bearing sleeve. By maintaining the refrigerant passing through the chamber surrounding such sleeve at a suitable temperature the water may be caused to form a layer of ice on such sleeve but leave a thin film of water adjacent the shaft to provide a lubricating film for such shaft.

For a more detailed description of the invention reference is made to the accompanying drawings wherein.

Figure 1:
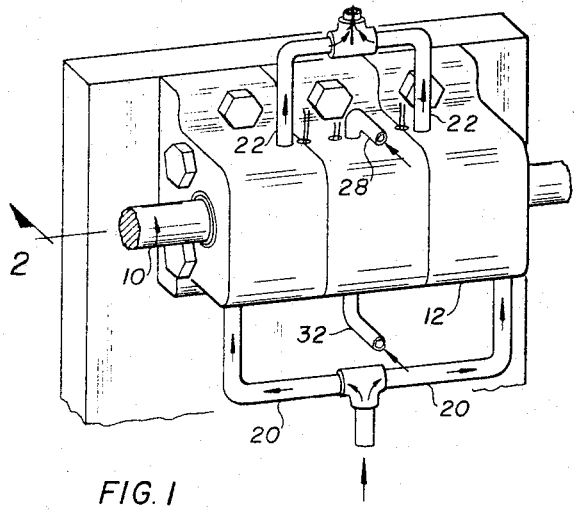
FIG. 1 is a perspective view of a bearing structure incorporating the invention.
Figure 3:
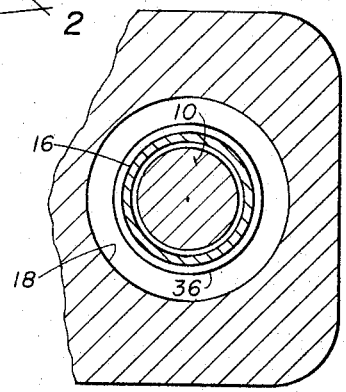
FIG. 3 is a sectional view taken along line 3—3 of FIG. 2.
Figure 2:
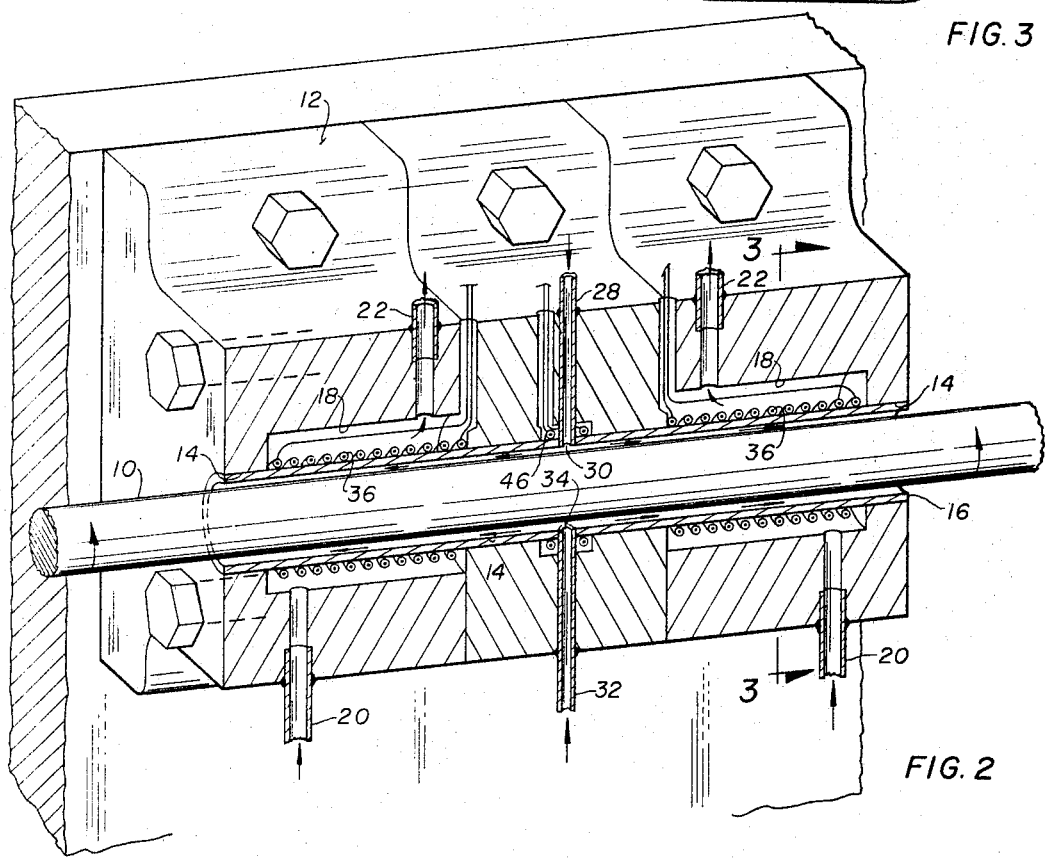
FIG. 2 is a perspective sectional view taken along line 2—2 of FIG. 1.

Referring now to the drawings, the illustrated embodiment of the invention comprises a bearing support for a rotating shaft 10 which is driven by some suitable means (not shown). The shaft 10 is supported within a pillow block 12 which, for the convenience of forming the interior structure thereof, may be formed in several sections and bolted or otherwise joined rigidly together. The pillow block defines an opening 14 through which extends a bearing sleeve 16 preferably of copper or other suitable metal capable of conducting heat relatively readily. The bearing block is formed with a pair of annular recesses or chambers 18 adjacent its opposite ends surrounding the sleeve 16. Conduits 20 are provided on the lower side thereof for conducting a refrigerant to the chambers 18 and further conduits 22 are provided for removing the refrigerant from the top of the chambers, which fluid may be recirculated through a suitable cooling system (not shown). The refrigerant is introduced to the bottom of the chambers 18 for two reasons. One is that the refrigerant will follow its natural convection path as it absorbs heat, but more importantly the colder refrigerant at the lower portion of the chambers 18 will maintain the lower portion of the sleeve 16 at a lower temperature thus to help compensate for the additional heating of the ice layer beneath the shaft caused by greater friction resulting from the imposition of the shaft weight thereon. In some instances additional means may be required to compensate for the extra frictional load on one portion of the bearing as compared to another portion.

Means are provided for introducing water into the interior of the sleeve 16 at the center of the bearing 12. Such means include an inlet line 28 extending through and defined by a suitable opening within the bearing 12 in alignment with an aperture 30 provided in the sleeve 16 and a further inlet line 32 aligned with an aperture 34 in the bottom of the sleeve 16.

To permit relatively rapid increase in the temperature of the sleeve 16, there may be positioned within each of the chambers 18 and surrounding the sleeve 16 heating coils 36 in the form of electrical resistance type wire, which coils are adapted to be connected to a suitable source of electrical energy. Heating means comprising a coil 46 may also be provided about the sleeve 16 adjacent the water inlets 28, 32 to prevent blockage of the inlets by freezing.

The operation of the structure of the invention is as follows: In commencing the driving of the shaft 10 water is introduced through the lines 28, 32 and refrigerant having a temperature less than 32° F. passed into the chambers 18 so as to effect the formation of a thin film of ice on the inner surface of the bearing sleeve 16. The lubrication in such bearing actually arises by reason of the presence of a thin film of water upon the surface of the ice between the shaft and the ice layer. Consequently, the temperature of the ice is maintained by adjusting the temperature of the refrigerant such that the friction of the shaft on the surface of the ice will cause melting thereof to maintain such thin film of water. As is well known, the coefficient of friction of water on ice is much less than that of oil on metal, hence there is little friction loss in the bearing 12. The heating coils 36, 46 facilitate the maintenance of the desired temperature in that heat may be applied through such coils in the event that the temperature of the ice decreases to the point where the friction is greater than is desired and more immediate compensation is required than can be obtained by raising the refrigerant temperature. So as to maintain the ice at a desired temperature, a plurality of temperature sensing devices (not shown) may be positioned within the bearing and connected to suitable control means to effect regulation of the temperature of the refrigerant and the heating coils. Suitable insulation (not shown) may be provided about the pillow block 10.

As will be apparent, the ice film on the sleeve 16 helps provide an effective seal against leakage of any gas through the bearing in the event that the bearing is placed in the wall of a vacuum chamber or the like, since the film of water on the layer of the ice is of minimum thickness and the relatively long path through the bearing minimizes leakage therethrough.

It will also be apparent that in the handling of foods or the like in a vacuum that the ice bearing is of great benefit in that water entering the vacuum chamber by reason of the evaporation thereof from the bearing will not be harmful to the foods.

In the instance of providing lubrication for a shaft it may be desirable in certain instances to circulate coolant through the shaft rather than the supporting structure or as a supplement to refrigerating the supporting structure.

Other applications of a fluid-frozen fluid lubricating arrangement will be immediately obvious. They may be used to advantage in, for example, thrust bearings, guides and slides and in numerous types of roller and ball bearing structures.

Having illustrated and described a preferred embodiment of the invention, it should be apparent to those skilled in the art that the invention permits of modification in arrangement and detail. I claim as my invention all such modifications as come within the true spirit and scope of the following claims.

I claim:

1. In a bearing for a shaft,
   a shaft,
   a supporting structure surrounding said shaft,
   means for cooling the surface of said structure opposing said shaft below the freezing point of water,
   and means for introducing water between said surface and said shaft.

2. In a bearing for a shaft,
   a shaft,
   a supporting structure therefor including means defining an annular refrigerant chamber encircling said shaft,
   means for circulating a refrigerant having a temperature less than 32° F. through said chamber,
   and means for introducing water between said shaft and said chamber defining means whereby said water forms a film of ice between said shaft and said supporting structure.

3. In a bearing for a shaft,
   a shaft,
   a metal sleeve surrounding said shaft,
   a housing surrounding said sleeve,
   means in said housing defining a passageway for a refrigerant having a temperature less than 32° F. to encircle and cool said sleeve,
   and means for introducing water into the interior of said sleeve whereby a film of ice is maintained on the inner surface of said sleeve.

4. In a bearing for a shaft,
   a shaft,
   a supporting structure surrounding said shaft,
   means for circulating a refrigerant having a temperature less than 32° F. through said structure so as to cool the surface of said structure surrounding said shaft below 32° F.,
   heating means in said supporting structure for increasing the temperature thereof,
   and means for flowing water between said shaft and said supporting structure.

5. In a bearing for a shaft,
   a shaft,
   a supporting structure therefor including means defining an annular refrigerant chamber encircling said shaft,
   means for circulating a refrigerant having a temperature less than 32° F. through said chamber,
   means for introducing water between said shaft and said chamber defining means whereby said water forms a film of ice between said shaft and said supporting structure,
   and a coil of electrical resistance type heater wire in said chamber adjacent the wall thereof facing said shaft to effect heating of said wall.

6. The method of providing lubrication between a rotating shaft and a supporting structure therefor which comprises;
   flowing a fluid between said shaft and said structure,
   and cooling said structure sufficiently to form a solidified layer of said fluid thereon while maintaining a fluidized layer of said fluid adjacent said shaft.

7. The method of claim 6 wherein said fluid is water.

8. In an antifriction bearing means for a rotatable shaft, the combination comprising:
   a shaft,
   a pillow block,
   a bearing sleeve in said block adapted to receive said shaft,
   said bearing sleeve having an inside diameter greater than the outside diameter of said shaft to provide space for the admission of water therebetween,
   means to admit water to said space,
   a chamber surrounding said sleeve, and
   means to continuously circulate a refrigerant through said chamber of sufficiently low temperature to freeze a layer of said water upon said sleeve and to maintain said layer of water in frozen condition, whereby the ice so formed provides a bearing surface for said shaft having a coefficient of friction less than that of oil on metal.

9. The invention as defined in claim 8 wherein a heating means is positioned adjacent said sleeve to maintain the temperature of said ice at an optimum value with respect to said coefficient of friction.

References Cited

UNITED STATES PATENTS 2,487,289   11/1949   Yeomans et al. _____ 308—5

MARTIN P. SCHWADRON, *Primary Examiner.*

FRANK SUSKO, *Examiner.*